United States Patent
Zeng et al.

(10) Patent No.: US 11,913,324 B2
(45) Date of Patent: Feb. 27, 2024

(54) DOWNHOLE MULTIDIMENSIONAL IMAGING FEATURE EXTRACTION METHOD AND IMAGING APPARATUS

(71) Applicants: CHINA PETROLEUM & CHEMICAL CORPORATION, Beijing (CN); SINOPEC RESEARCH INSTITUTE OF PETROLEUM ENGINEERING, Beijing (CN)

(72) Inventors: Yijin Zeng, Beijing (CN); Wei Zhang, Beijing (CN); Weining Ni, Beijing (CN); Xin Li, Beijing (CN); Lipeng Yan, Beijing (CN); Jinping Wu, Beijing (CN); Yuefa Hu, Beijing (CN); Lishuang Wang, Beijing (CN); Zuyang Zhu, Beijing (CN); Jintai Mi, Beijing (CN)

(73) Assignees: CHINA PETROLEUM & CHEMICAL CORPORATION, Beijing (CN); SINOPEC RESEARCH INSTITUTE OF PETROLEUM ENGINEERING, Beijing (CN)

(*) Notice: Subject to any disclaimer, the term of this patent is extended or adjusted under 35 U.S.C. 154(b) by 170 days.

(21) Appl. No.: 17/753,481

(22) PCT Filed: Aug. 26, 2020

(86) PCT No.: PCT/CN2020/111392
§ 371 (c)(1),
(2) Date: Mar. 3, 2022

(87) PCT Pub. No.: WO2021/043043
PCT Pub. Date: Mar. 11, 2021

(65) Prior Publication Data
US 2022/0333478 A1    Oct. 20, 2022

(30) Foreign Application Priority Data

Sep. 5, 2019   (CN) .......................... 201910837890.4

(51) Int. Cl.
*E21B 47/002* (2012.01)
*E21B 47/13* (2012.01)
(Continued)

(52) U.S. Cl.
CPC .......... *E21B 47/0025* (2020.05); *E21B 47/13* (2020.05); *E21B 47/18* (2013.01); *E21B 47/017* (2020.05)

(58) Field of Classification Search
None
See application file for complete search history.

(56) References Cited

U.S. PATENT DOCUMENTS 5,142,472 A     8/1992  Day et al.
2006/0220649 A1* 10/2006 Martinez ................. E21B 47/01
                                                    324/347
(Continued)

FOREIGN PATENT DOCUMENTS

CN          1696742 A     11/2005
CN        104074513 A     10/2014
(Continued)

OTHER PUBLICATIONS

Maeso, C. J. et al.; "Field Test Results of a New High-Resolution, Dual-Physics Logging-While-Drilling Imaging Tool in Oil-Base Mud"; SPELS 59th Annual Logging Symposium; Jun. 2-6, 2018; pp. 1-17.

*Primary Examiner* — Vincent Q Nguyen
(74) *Attorney, Agent, or Firm* — NKL Law; Allen Xue

(57) ABSTRACT

An apparatus for downhole multi-dimensional imaging includes an acquisition unit configured to acquire a formation resistivity signal, an ultrasonic echo signal and an
(Continued)

orientation signal regularly; a sector calculation unit configured to calculate, based on said orientation signal, a sector where a currently acquired signal is from; and a multi-dimensional imaging unit, configured to calculate, based on the signals acquired by the acquisition unit, data of resistivity, distance from a drilling tool to a borehole wall and ultrasonic echo amplitude, and distribute said data into all sectors for feature recognition and extraction, thus obtaining key features characterizing a current formation being drilled, said key features being transmitted to ground for guiding drilling process. The structural complexity and the length of the downhole imaging measurement instrument can be reduced, and feature recognition can be directly performed on the imaging data underground.

5 Claims, 9 Drawing Sheets

(51) Int. Cl.
*E21B 47/18* (2012.01)
*E21B 47/017* (2012.01)

(56) References Cited

U.S. PATENT DOCUMENTS

| | | |
|---|---|---|
| 2008/0228401 A1 | 9/2008 | Zhou et al. |
| 2015/0114714 A1 | 4/2015 | Dahl et al. |
| 2017/0115421 A1 | 4/2017 | Endo et al. |
| 2017/0115423 A1 | 4/2017 | Hori et al. |
| 2018/0292563 A1 | 10/2018 | Zhong et al. |
| 2020/0392839 A1* | 12/2020 | Dwars .................... E21B 21/12 |

FOREIGN PATENT DOCUMENTS

| | | |
|---|---|---|
| CN | 104076405 A | 10/2014 |
| CN | 204126629 U | 1/2015 |
| CN | 104727812 A | 6/2015 |
| CN | 107701170 A | 2/2018 |
| CN | 107725041 A | 2/2018 |
| CN | 107762487 A | 3/2018 |
| CN | 107942393 A | 4/2018 |
| CN | 108240213 A | 7/2018 |
| CN | 108345719 A | 7/2018 |

\* cited by examiner

DOWNHOLE MULTIDIMENSIONAL IMAGING FEATURE EXTRACTION METHOD AND IMAGING APPARATUS

CROSS REFERENCE OF RELATED APPLICATION

This application is a U.S. national stage entry of PCT International Application No. PCT/CN2020/111392, filed Aug. 26, 2020, which claims the priority of Chinese patent application No. 201910837890.4, entitled "Downhole multidimensional imaging feature extraction method and imaging apparatus" and filed on Sep. 5, 2019, the entire content of which is incorporated herein by reference.

TECHNICAL FIELD

The present invention relates to the technical field of oil and gas exploration and exploitation, in particular to a multi-dimensional imaging feature extraction method and an imaging device for downhole drilling.

TECHNICAL BACKGROUND

With continuous exploitation of oil and natural gas, the development of early conventional oil and gas reservoirs has come to an end. At present, there is a trend toward the development of unconventional oil and gas reservoirs and complex oil and gas reservoirs, from shallow to deep formations. Measurement-While-Drilling (MWD) technique is becoming more and more common in the exploitation of these unconventional and complex oil and gas reservoirs. The MWD technique used in these complex oil and gas reservoirs puts forward higher requirements on MWD instruments, especially on the measurements of important parameters, such as resistivity, ultrasound, or the like. These requirements include: higher integration, lower power consumption, higher resolution of measurement, higher accuracy of measurement, adaptation to both water-based and oil-based drilling fluids, selection of working modes, and faster data acquisition.

When drilling, on the one hand, the simpler the assembly and combination of the downhole drilling tools, the less the risk of sticking or the like would happen. On the other hand, the more data measured in downhole, the better it is to understand various downhole anomalies. Therefore, more MWD instruments are required to be assembled and combined together, which increases the complexity of the drilling tool assembly. Currently, all MWD instruments of various types each have an independent sub, or a function-independent module. If multiple parameters need to be measured, various instruments have to be combined together mechanically. However, more mechanical combinations would bring more hidden risks.

For resistivity imaging measurement, conventional measurement subs cannot be used for both of water-based drilling fluid and oil-based drilling fluid. Therefore, when the drilling fluid system is changed, the measuring sub must be replaced, which would result in tripping-out.

In addition, currently measured data is directly stored or transmitted, without further processing of data and recognition of formation feature information. In particular, due to the limitation of telemetry while drilling, it is impossible in the prior arts to transmit imaging-while-drilling data to the ground in real time.

SUMMARY OF THE INVENTION

In view of the above technical problems, the present invention proposes an apparatus for downhole multi-dimensional imaging, comprising: an acquisition unit, configured to acquire a formation resistivity signal, an ultrasonic echo signal and an orientation signal regularly; a sector calculation unit, configured to calculate, based on said orientation signal, a sector where a currently acquired signal is from; a multi-dimensional imaging unit, configured to calculate, based on the formation resistivity signal and the ultrasonic echo signal acquired by the acquisition unit, data of resistivity, of distance from a drilling tool to a borehole wall and of ultrasonic echo amplitude, and distribute said data into all sectors, so as to generate multi-dimensional imaging data including imaging data of the resistivity, imaging data of the distance from the drilling tool to the borehole wall, and imaging data of the ultrasonic echo amplitude; and a formation feature recognition unit, configured to perform feature recognition and extraction on the imaging data of the resistivity, the imaging data of the distance from the drilling tool to the borehole and the imaging data of the ultrasonic echo amplitude, so as to obtain key features characterizing a current formation being drilled, said key features being transmitted to ground for guiding drilling process.

It is preferred for the apparatus for downhole multi-dimensional imaging according to the present invention that the acquisition unit comprises: a resistivity detecting module, which further comprises a current signal transmission driving circuit, a current signal transmitting ring, and a current receiving electrode, for transmitting a current signal generated by the current signal transmission driving circuit to the formation through the current signal transmitting ring, and then receiving a part of the current signal returned from the formation through the current receiving electrode, the part of the current signal being related to the resistivity of the formation; an ultrasonic signal exciting and receiving module, for transmitting ultrasound to the borehole wall and receiving an ultrasonic signal reflected from the borehole wall; and a sector detecting module, for detecting a current position of a tool face in a drilling rotation, in order to determine a sector where measured data is from.

It is preferred for the apparatus for downhole multi-dimensional imaging according to the present invention that the apparatus further comprises a drilling fluid detection unit, configured to detect a type of drilling fluids, so that the current signal transmission driving circuit transmits AC electrical signals of different frequencies according to different types of drilling fluids.

It is preferred for the apparatus for downhole multi-dimensional imaging according to the present invention that the key features include a transition from a high resistivity formation to a low resistivity formation, a transition from a low resistivity formation to a high resistivity formation, formation fractures, formation caves, formation collapse, and indented formations.

It is preferred for the apparatus for downhole multi-dimensional imaging according to the present invention that the formation feature recognition unit is configured to: select the imaging data of the resistivity along a perimeter of a borehole perimeter in a latest depth, which is represented by a two-dimensional array $R_{xy}$, where x is coordinate along the perimeter of the borehole, and y is coordinate of a depth of the borehole; calculate an average resistivity for the imaging data of the resistivity in a first row of the two-dimensional array $R_{xy}$; search, from a second row of the two-dimensional array $R_{xy}$, a resistivity imaging data, which has a difference between its own resistivity and the average resistivity larger than a predetermined threshold, in sequence; and record subscript values of said data and store them in an array $U_a$, in order to calculate formation feature data.

It is preferred for the apparatus for downhole multi-dimensional imaging according to the present invention that the formation feature data comprises: the average resistivity of the first row, a resistivity of another formation, an orientation D_IN of entering another formation, an angle of entering another formation, and the total distance S of entering another formation.

According to another aspect of the present invention, a method for downhole multi-dimensional imaging is proposed, comprising steps of: acquiring a formation resistivity signal, an ultrasonic echo signal and an orientation signal regularly; calculating, based on said orientation signal, a sector where a currently acquired signal is from; calculating, based on the formation resistivity signal and the ultrasonic echo signal acquired, data of resistivity, of distance from a drilling tool to a borehole wall and of ultrasonic echo amplitude, and distributing said data into all sectors, so as to generate multi-dimensional imaging data including imaging data of the resistivity, imaging data of the distance from the drilling tool to the borehole wall, and imaging data of the ultrasonic echo amplitude; and performing feature recognition and extraction on the imaging data of the resistivity, the imaging data of the distance from the drilling tool to the borehole wall and the imaging data of the ultrasonic echo amplitude, so as to obtain key features characterizing a current formation being drilled, said key features being transmitted to ground for guiding drilling process.

It is preferred for the method for downhole multi-dimensional imaging according to the present invention that the method further comprises a step of detecting a type of drilling fluid, so as to transmit AC signals of different frequencies according to different types of drilling fluids.

It is preferred for the method for downhole multi-dimensional imaging according to the present invention that the key features include: a transition from a high resistivity formation to a low resistivity formation, a transition from a low resistivity formation to a high resistivity formation, formation fractures, formation caves, formation collapse, and indented formations.

It is preferred for the method for downhole multi-dimensional imaging according to the present invention that the step of performing formation feature recognition includes: selecting the imaging data of the resistivity along a perimeter of a borehole in a latest depth, which is represented by a two-dimensional array $R_{xy}$, where x is coordinate along the perimeter of the borehole, and y is coordinate of a depth of the borehole; calculating an average resistivity for the imaging data of the resistivity in a first row of the two-dimensional array $R_{xy}$; searching, from a second row of the two-dimensional array $R_{xy}$, a resistivity imaging data, which has a difference between its own resistivity and the average resistivity larger than a predetermined threshold, in sequence; and recording subscript values of said data and storing them in an array $U_a$, in order to calculate an orientation of entering another formation, an angle of entering another formation, and the total distance of entering another formation.

The beneficial technical effects of the present invention are as follows. According to the downhole multi-dimensional imaging apparatus and method of the present invention, the structure of the imaging MWD instrument can be adequately optimized, the structural complexity of the instrument can be reduced, and an imaging measurement in multiple dimensions can be realized. According to the present invention, the resistivity receiving electrode and the ultrasonic transducer are arranged on one single sub, which can shorten the length of the MWD instrument by more than 1 m, thus not only saving the cost, but also reducing the safety risk of the instrument. By using the sector detecting module to provide sector detection for resistivity and ultrasonic signal imaging measurements, power consumption of this portion can be reduced by more than 100 mW, which is also beneficial for extending battery life and reducing use cost. The symmetrical arrangement of the upper and lower electrical signal transmitting toroids is more conducive for current signals to enter the formation, so that the measured formation resistivity is less affected by the drilling fluid in the borehole. Moreover, according to the present invention, feature recognition of imaging data can be processed underground, and key features after processed can be clearly expressed in a few bytes, so that they can be completely transmitted to the ground through a transmission-while-drilling device.

Other features and advantages of the present invention will be set forth in the description which follows, and in part will be apparent from the description, or may be learned from implementation of the present invention. The objectives and other advantages of the present invention may be realized and attained from the structure particularly pointed out in the description, claims and drawings.

BRIEF DESCRIPTION OF THE DRAWINGS

The accompanying drawings are used to provide a further understanding of the present invention, and constitute a part of the description. Together with the embodiments of the present invention, the drawings are intended to explain the present invention, rather than constitute any limitation to the present invention. In the drawings.

DETAILED DESCRIPTION OF EMBODIMENTS

In order to enable the objectives, technical solutions and advantages of the present invention clearer, the embodiments of the present invention will be further described in detail below with reference to the accompanying drawings.

Figure 1A:
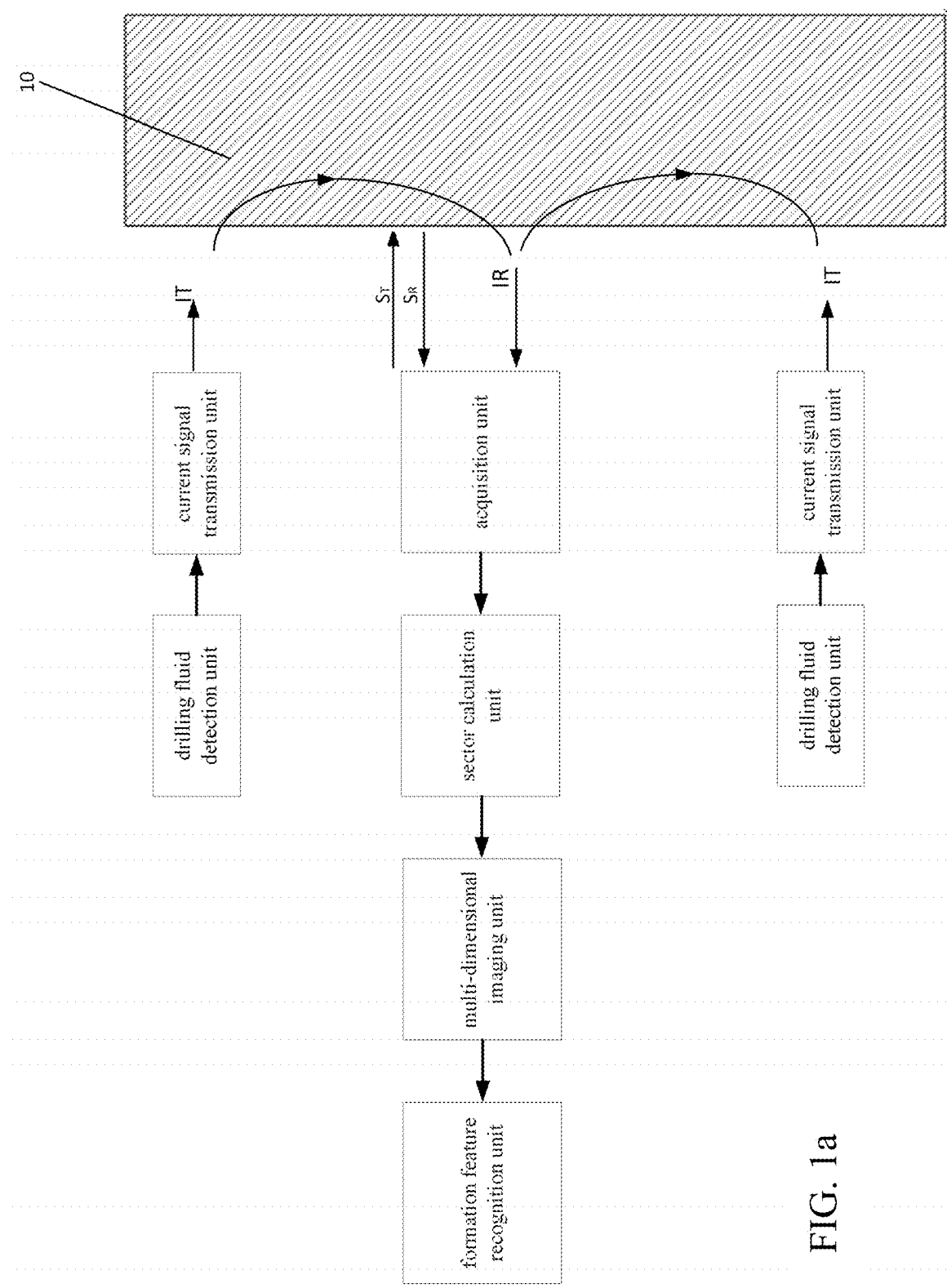
FIGS. 1a and 1b show a structural block diagram of a multi-dimensional imaging MWD apparatus according to an embodiment of the present invention, respectively.

FIG. 1a shows a general schematic diagram of a multi-dimensional imaging MWD apparatus according to an embodiment of the present invention. Specifically, the apparatus includes an acquisition unit, a sector calculation unit, a multi-dimensional imaging unit, and a formation feature recognition unit. In one embodiment, the apparatus may further include a drilling fluid detection unit for detecting a type of drilling fluid, so that a current signal transmission driving circuit can transmit AC signals of different frequencies according to different types of drilling fluids.

Figure 1B:
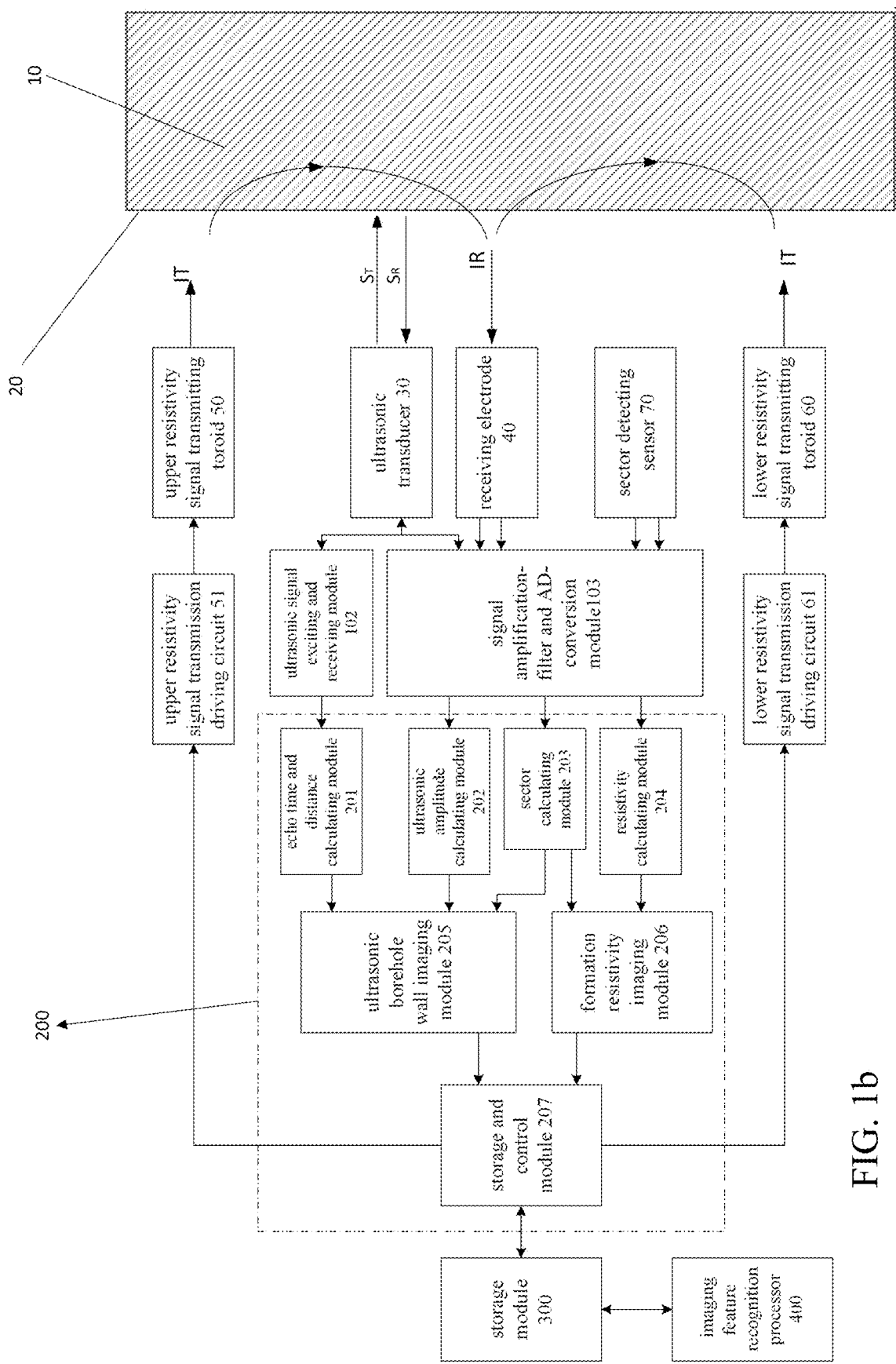

The acquisition unit as shown in FIG. 1a is configured to acquire a formation resistivity signal, an ultrasonic echo signal and an orientation signal regularly. As shown in FIG. 1b, the acquisition unit further includes: a resistivity detecting module, which further includes a current signal transmission driving circuit, a current signal transmitting ring, and a current receiving electrode, for transmitting a current signal generated by the current signal transmission driving circuit to the formation through the current signal transmitting ring, and then receiving a part of the current signal returned from the formation through the current receiving electrode, said part of the current signal being related to the resistivity of the formation; an ultrasonic signal exciting and receiving module, for transmitting ultrasound to a borehole wall and receiving an ultrasonic signal reflected from the borehole wall; and a sector detecting module, for detecting a current position of a tool face in the drilling rotation, in order to determine the sector where the measured data is from.

As shown in FIG. 1a, the sector calculation unit is configured to calculate, based on the orientation signal detected by a sector detection sensor 70, the sector which the currently acquired signal is from. The multi-dimensional imaging unit is configured to calculate data of the resistivity, of the distance from the drilling tool to the borehole wall and of the ultrasonic echo amplitude, based on the formation resistivity signal and the ultrasonic echo signal acquired by the acquisition unit, and distribute said data into all sectors, so as to generate multi-dimensional imaging data including imaging data of the resistivity, imaging data of the distance from the drilling tool to the borehole wall, and imaging data of the ultrasonic echo amplitude.

The formation feature recognition unit is configured to perform feature recognition and extraction on the imaging data of the resistivity, the imaging data of the distance from the drilling tool to the borehole wall, and the imaging data of the ultrasonic echo amplitude, so as to obtain key features characterizing the current drilling formation. Said key features can be transmitted to the ground for guiding the drilling process. In the formation feature recognition unit, the imaging data of the resistivity along the borehole perimeter for the latest depth is selected, and represented by a two-dimensional array $R_{xy}$, where x is coordinate of the borehole perimeter, and y is coordinate of the depth. An average resistivity for the imaging data of the resistivity in a first row of the two-dimensional array $R_{xy}$ is calculated. From a second row of the two-dimensional array $R_{xy}$, the imaging data of the resistivity, which has a difference between its own resistivity and the average resistivity larger than a predetermined threshold, is searched in sequence. The subscript values of said data are recorded and stored in an array $U_a$, in order to calculate the orientation of entering another resistivity formation, the angle of entering another resistivity formation, and the total distance of entering the formation. The feature data includes: the average resistivity of the first row, the resistivity of another formation, the orientation D_IN of entering said another formation, and the total distance S of entering said another formation. The specific feature recognition and extraction method will be described in further detail below.

It can be seen from FIG. 1b that the multi-dimensional imaging MWD apparatus of the present invention includes an ultrasonic transducer 30, a receiving electrode 40, an upper resistivity signal transmitting toroid 50, a lower resistivity signal transmitting toroid 60, a sector detecting sensor 70, an ultrasonic signal exciting and receiving module 102, a signal amplification-filter and AD-conversion module 103, a microprocessor module 200, a storage module 300, and an imaging feature recognition processor 400.

The microprocessor module 200 controls the working process of the whole apparatus. The microprocessor module 200 consists of a programmable microprocessor and its peripheral circuits. The program inside the microprocessor module 200 is composed of the following program modules: an echo time and distance calculating module 201, an ultrasonic amplitude calculating module 202, a sector calculating module 203, a resistivity calculating module 204, an ultrasonic borehole wall imaging module 205, a formation resistivity imaging module 206, and a storage and control module 207.

The working process of the whole apparatus is as follows. After the microprocessor module 200 is started, the storage and control module 207 activates an upper resistivity signal transmission driving circuit 51 and a lower resistivity signal transmission driving circuit 61, which, in turn, drive the upper resistivity signal transmitting toroid 50 and the lower resistivity signal transmitting toroid 60, respectively, in order to simultaneously transmit current signals into the formation 10 adjacent to the apparatus. Part of the current flows back to the receiving electrode 40 through the formation, and the magnitude of the current received by the receiving electrode 40 is dependent on the resistivity of the formation nearby.

In a first cycle of acquisition, the storage and control module 207 cyclically activates the ultrasonic signal exciting and receiving module 102 to excite the ultrasonic transducer 30, so that the ultrasonic echo time is collected by the echo time and distance calculating module 201, based on which the distance from the ultrasonic transducer 30 to the borehole wall 20 is further calculated.

In a second cycle of acquisition, the storage and control module 207 cyclically activates the ultrasonic amplitude calculating module 202, which obtains and calculates the amplitude of the signal that is received by the ultrasonic transducer 30 and collected by the signal amplification-filter and AD-conversion module 103, so that the amplitude of the ultrasonic echo is calculated.

In a third cycle of acquisition, the storage and control module 207 cyclically activates the resistivity calculating module 204, which obtains and calculates the amplitude of the signal that is received by the receiving electrode 40 and collected by the signal amplification-filter and AD-conversion module 103, so that the amplitude of the received current, and further the resistivity are calculated.

In a four cycle of acquisition, the storage and control module 207 cyclically activates the sector calculating module 203, which obtains and calculates the orientation signal that is detected by the sector detecting sensor 70 and collected by the signal amplification filter and analog-to-digital conversion module 103.

The above four cycles can be combined in any order, for acquisition of corresponding data.

The data calculated by the echo time and distance calculating module 201, the data calculated by the ultrasonic amplitude calculating module 202, and the data calculated by the sector calculating module 203 are output to the ultrasonic borehole wall imaging module 205, which, according to a preset sector resolution (such as 128 sectors), sorts out the data calculated by the echo time and distance calculating module 201 and that calculated by the ultrasonic amplitude calculating module 202 and distributes them to said 128 sectors, thus generating ultrasonic borehole wall distance imaging data and amplitude imaging data. The ultrasonic borehole wall distance imaging data and amplitude imaging data are stored in the storage module 300 through the storage and control module 207. The storage module 300 is composed of a memory chip, that is, a peripheral circuit.

The data calculated by the resistivity calculating module 204 and that calculated by the sector calculating module 203 are output to the formation resistivity imaging module 206, which, according to a preset sector resolution (such as 128 sectors), sorts out the data calculated by the resistivity calculating module 204 and distributes it to said 128 sectors, thus generating resistivity imaging data.

The resistivity imaging data is stored in the storage module 300 through the storage and control module 207.

At this stage, the storage module 300 contains imaging data in three dimensions, i.e., the ultrasonic borehole wall distance imaging data, the amplitude imaging data, and the resistivity imaging data.

The imaging feature recognition processor 400 reads from the storage module 300 the ultrasonic borehole wall distance imaging data, the amplitude imaging data, the and the resistivity imaging data as acquired, in order to perform feature recognition and extraction. Key features are extracted in a few bytes, and then sent to the ground through a transmission-while-drilling device.

In one embodiment, the downhole multi-dimensional imaging measurement apparatus provided by the present invention includes: a drilling collar, a wear-resistant strip, one or more ultrasonic transducers, one or more ultrasonic signal exciting and receiving modules, one or more resistivity signal transmitting toroids, one or more resistivity signal transmission driving circuits, one or more resistivity receiving electrodes, a sector detecting sensor, a signal amplification-filter and AD-conversion circuit, a microprocessor module, a storage module, and an imaging feature recognition processor.

The wear-resistant strip, the ultrasonic transducer, the resistivity signal transmitting toroid and the resistivity receiving electrode are all arranged in a groove formed on a surface of the drilling collar.

The ultrasonic signal exciting and receiving module, the resistivity signal transmission driving circuit, the signal amplification-filter and AD-conversion circuit, the microprocessor module, the storage module and the imaging feature recognition processor are all arranged inside the drilling collar.

One port of the ultrasonic transducer is connected to one port of the ultrasonic signal exciting and receiving module, and the other port of the ultrasonic signal exciting and receiving module is connected to multiple ports of the microprocessor module. The other port of the ultrasonic transducer is connected to one port of the signal amplification-filter and AD-conversion circuit.

The port of the resistivity signal transmitting toroid is connected to one port of the resistivity signal transmission driving circuit, and the other port of the resistivity signal transmission driving circuit is connected to multiple ports of the microprocessor module.

The port of the resistivity receiving electrode is connected to the other port of the signal amplification-filter and AD-conversion circuit.

The signal amplification-filter and AD-conversion circuit is connected with multiple ports of the microprocessor module.

A set of ports of the storage module is connected to multiple ports of the microprocessor module. Another set of ports of the storage module is connected to multiple ports of the imaging feature recognition processor.

The microprocessor module controls the working process of the whole apparatus. The microprocessor module consists of a programmable microprocessor and its peripheral circuits. The program inside the microprocessor module is composed of the following program modules: an echo time and distance calculating module, an ultrasonic amplitude calculating module, a sector calculating module, a resistivity calculating module, an ultrasonic borehole wall imaging module, a formation resistivity imaging module, and a storage and control module.

The microprocessor module outputs, through an internal program module, a driving signal to cyclically drive the resistivity signal transmission driving circuit, and further drive the resistivity signal transmitting toroid to transmit a current into the formation. A part of the current signal flows, after passing through the formation, to the resistivity receiving electrode, and further to the signal amplification-filter and AD-conversion circuit, where it is converted into a digital signal and read by the microprocessor module.

The microprocessor module outputs, through the internal program module, a driving signal to the ultrasonic signal exciting and receiving module, and further drives the ultrasonic transducer to transmit ultrasound to the borehole wall. After reflected to the ultrasonic transducer from the borehole wall, the signal is further received by the ultrasonic signal exciting and receiving module. The time difference of the echo obtained by the ultrasonic signal exciting and receiving module is read by the microprocessor module. The signal is further input to the signal amplification-filter and AD-conversion circuit, where it is converted into a digital signal and read by the microprocessor module.

The microprocessor module outputs, through the internal program module, a controlling signal to the sector detecting sensor, which outputs a signal reflecting the current position of the tool face in the drilling rotation. The signal is input to the signal amplification-filter and AD-conversion circuit, where it is converted into a digital signal and read by the microprocessor module.

The microprocessor module cyclically reads the above signals, and calculates the imaging data according to the sector position, and stores it in the storage module.

The imaging feature recognition processor reads out several sets of data from the storage module regularly, for analysis, processing, feature recognition and extraction. The extracted features are of a few bytes only. Such a few bytes reflecting the features are sent to the ground through the transmission-while-drilling device.

According to one embodiment of the present invention, the feature concerning a transition from a high resistivity formation to a low resistivity formation is extracted. In a pre-processing step, the threshold of formations with different resistivity is set as an average resistance difference R_DIFF, which can be set as a specific value according to the actual application.

The extraction includes steps of: performing high-resolution imaging resistivity acquisition; selecting the latest imaging data; calculating an average resistivity of the first row; searching, from the second row, the coordinate of the imaging point with a difference between its own resistivity and the average resistivity exceeding R_DIFF; calculating an orientation D_IN of entering another formation; calculating an angle θ of entering into another formation and an average resistivity $R_{fAVG}$ of said another formation; and transmitting the feature values. Details of the steps will be introduced in the following.

According to an embodiment of the present invention, all the hardware components for the measurement do not need to be changed. Under the control by the program in the microprocessor, the formation resistivity under the conditions of the water-based drilling fluid and the oil-based drilling fluid can be measured, respectively, through adjusting the frequency of the electrical signal transmitted. For the water-based drilling fluid, the program in the microprocessor generates an electrical signal with a lower frequency, so that by means of the driving circuit and the toroid, a current is sent directly to the drilling fluid in the borehole, further into the formation, and then back to the receiving electrode. Then, the program in the microprocessor further performs corresponding acquisition and calculation. For the oil-based drilling fluid, the program in the microprocessor generates an electrical signal with a higher frequency, so that by means of the driving circuit and the toroid, a current is transmitted through AC coupling to the drilling fluid in the borehole, further into the formation, and then back to the receiving electrode through AC coupling. Then, the program in the microprocessor further performs corresponding acquisition and calculation.

Figure 2A:
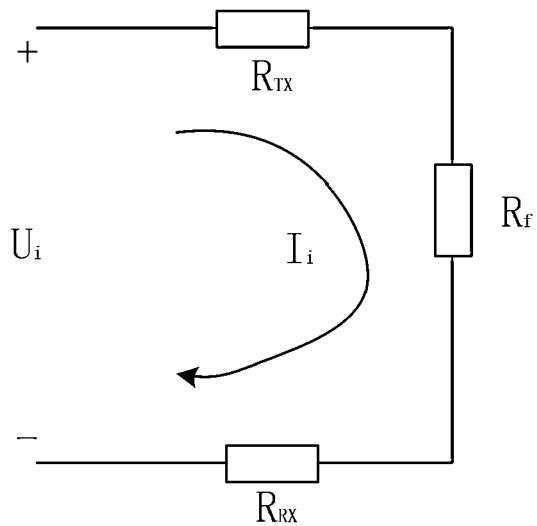
FIGS. 2a and 2b show an equivalent measurement circuit in a water-based drilling fluid environment and an oil-based drilling fluid environment, respectively.

FIG. 2a shows an equivalent measurement circuit in a water-based drilling fluid environment, wherein the upper resistivity signal transmitting toroid 50 or the lower resistivity signal transmitting toroid 60 and the drilling fluid in the borehole constitute an equivalent resistance $R_{TX}$, the formation 10 constitutes an equivalent resistance $R_f$, and the receiving electrode 40 constitutes an equivalent resistance $R_{RX}$.

Under the water-based drilling fluid environment, since the water-based drilling fluid has better electrical conductivity, the microprocessor 200 generates a transmission signal with a lower frequency, which can be alternatively generated by an external dedicated chip module. The external dedicated chip module includes, but not limited to, a direct numerical frequency synthesis (DDS), a DA converter or the like, with a suitable frequency range of 100-20,000 Hz. However, this frequency range is not intended to limit the implementation of the present invention. The transmission signal generated by the microprocessor 200 passes through the upper resistivity signal transmission driving circuit 51 and the lower resistivity signal transmission driving circuit 61 respectively, and then enters the lower resistivity signal transmitting toroid 60 through the upper resistivity signal transmitting toroid 50. The electrical signal directly enters the water-based drilling fluid in the borehole, passes through the formation 10, and then returns to the receiving electrode 40.

According to a simplified logging circuit model, it can be obtained that the equivalent resistance $R_f = a(U_i/I_i)$, where $U_i$ is transmitting voltage amplitude, $I_i$ is current amplitude measured at the receiving electrode 40, and a is correction parameter. The values of the above-mentioned amplitudes are calculated by the signal amplification-filter and AD-conversion module 103 and the microprocessor 200 as shown in FIG. 1b. Next, based on the known equivalent resistance $R_f$ of the formations of different orientations, logging information, such as formation resistivity imaging, can be further obtained.

Figure 2B:
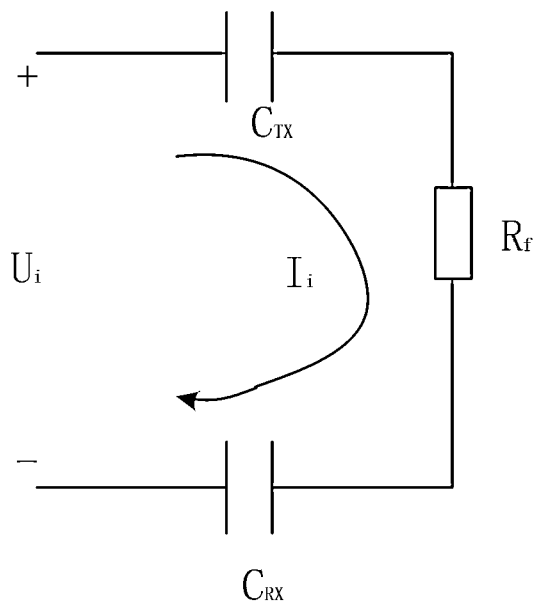

FIG. 2b shows an equivalent measurement circuit in an oil-based drilling fluid environment, wherein the upper resistivity signal transmitting toroid 50 or the lower resistivity signal transmitting toroid 60 and the drilling fluid in the borehole constitute an equivalent resistance $C_{TX}$, the formation 10 constitutes an equivalent resistance $C_f$, and the receiving electrode 40 constitutes an equivalent resistance $C_{RX}$.

Under the oil-based drilling fluid environment, since the water-based drilling fluid has poor electrical conductivity, the microprocessor 200 generates a transmission signal with a higher frequency, which can be alternatively generated by an external dedicated chip module. The external dedicated chip module includes, but not limited to, a direct numerical frequency synthesis (DDS), a DA converter or the like, with a suitable frequency range of 20,000-200,000 Hz. However, this frequency range is not intended to limit the implementation of the present invention. The transmission signal generated by the microprocessor 200 passes through the upper resistivity signal transmission driving circuit 51 and the lower resistivity signal transmission driving circuit 61 respectively, and then enters the lower resistivity signal transmitting toroid 60 through the upper resistivity signal transmitting toroid 50. The electrical signal directly enters the oil-based drilling fluid in the borehole through AC coupling, passes through the formation 10, and then returns to the receiving electrode 40 through AC coupling.

According to a simplified logging circuit model, it can be obtained that the equivalent resistance $R_f = a(U_i/I_i)\cos\beta$, where $U_i$ is transmitting voltage amplitude, $I_i$ is current amplitude measured at the receiving electrode 40, and a is correction parameter. The values of the above-mentioned amplitudes are calculated by the signal amplification-filter and AD-conversion module 103 and the microprocessor 200 as shown in FIG. 1b. Phase f can be calculated by means of digital phase-sensitive demodulation technology. Next, based on the known equivalent resistance $R_f$ of the formations of different orientations, logging information, such as formation resistivity imaging, can be further obtained.

Therefore, according to this embodiment, the same hardware components can be used for imaging measurements on the formation resistivity for two different drilling fluids (i.e., the water-based drilling fluid and the oil-based drilling fluid) through suitable programming controls in the microprocessor 200.

Figure 3:
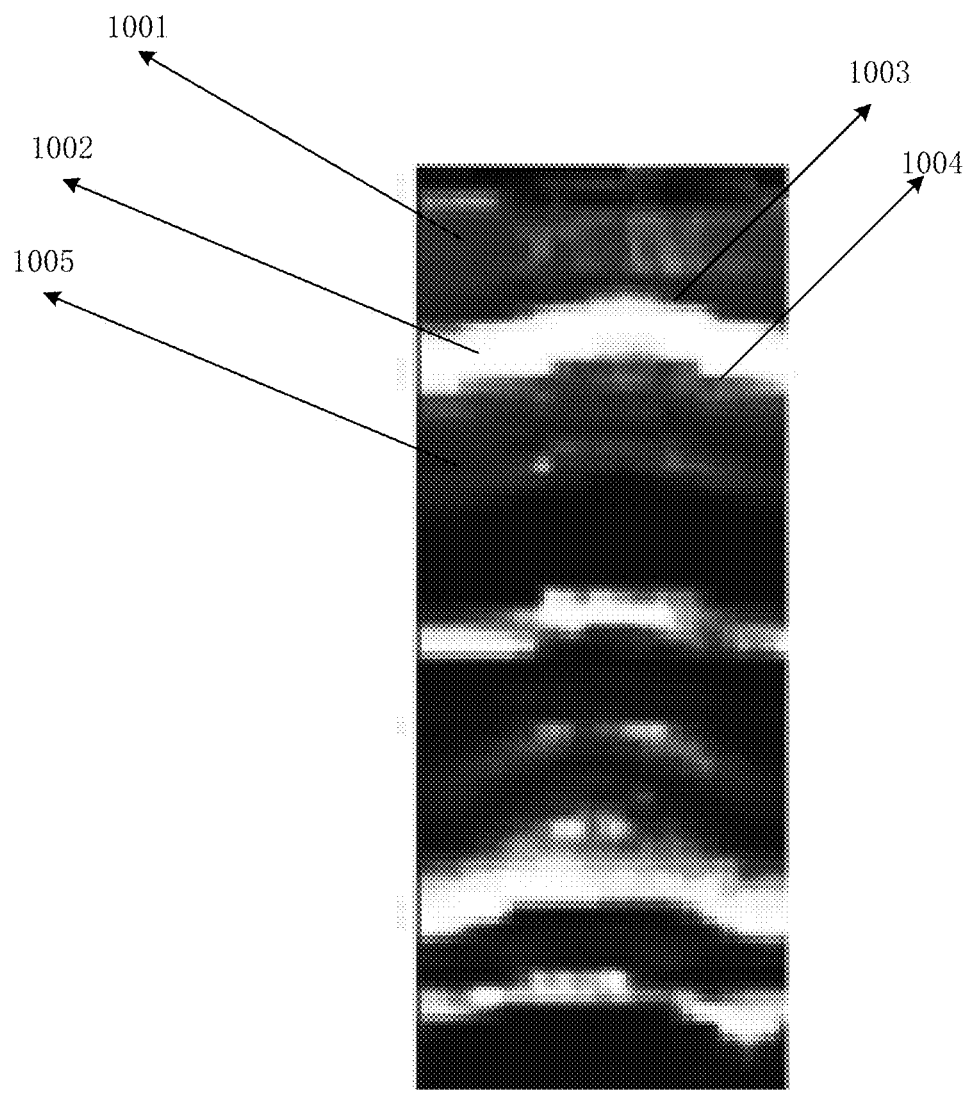
FIG. 3 shows a resistivity imaging diagram formed by data obtained from an imaging measurement apparatus according to an embodiment of the present invention.

FIG. 3 shows a resistivity imaging diagram generated by data obtained from an imaging measurement apparatus according to the present invention. The diagram contains information concerning a transition from a low resistivity formation to a high resistivity formation, a transition from a high-resistivity formation to a low resistivity formation, etc., which means that the drilling process enters one formation from another formation. The diagram is stored in a memory in form of a two-dimensional array. In the array, two dimensions of each number represent the coordinate of the borehole perimeter and the coordinate of the depth, respectively. The value of the data is represented by grayscale. The greater the resistivity, the lighter the grayscale is, while the smaller the resistivity, the darker the grayscale is. The sudden change in color in FIG. 3 indicates that the measurement point passes through an interface between two different formations in drilling. Reference sign 1001 indicates the low resistivity formation, 1002 indicates the high resistivity formation, 1003 indicates an interface from the low resistivity formation to the high resistivity formation, 1004 indicates an interface from the high resistivity formation to the low resistivity formation, and 1005 indicates the low resistivity formation.

Through analysis and processing of the formation resistivity imaging data acquired while drilling, it can be determined whether there is a transition of entering one formation from another formation during the drilling process, so as to further determine whether the transition is from a high resistivity formation to a low resistivity formation, or from a low resistivity formation to a high resistivity formation, and still further, calculate information such as the angle of entering a different formation.

In the following, how to extract the required formation feature data based on the acquired data will be described. In the present invention, the threshold of formations with different resistivity is set as an average resistance difference R_DIFF, which can be set as a specific value according to the actual application.

The steps of extraction are introduced in detail as follows.

The first step is to acquire imaging resistivity with high resolution. According to an embodiment of the present invention, a MWD high-resolution imaging resistivity system is used to acquire the borehole perimeter data at a fixed time interval t. The data along a whole borehole perimeter includes, for example, n points in total.

The second step is to select the latest imaging data. The resistivity imaging data along the borehole perimeter for the latest depth of the borehole is selected, and on this basis a two-dimensional array $R_{xy}$ is established, where x=1, 2, 3, . . . , n; y=1, 2, 3, . . . , m; x is coordinate of the borehole perimeter, ranging from 1 to n; and y is coordinate of the depth, ranging from 1 to m. Accordingly, the two-dimensional array $R_{xy}$ can be expressed as follows:

$R_{11}, R_{12}, R_{13}, \ldots, R_{1n}$
$R_{21}, R_{22}, R_{23}, \ldots, R_{2n}$
. . .
. . .
$R_{m1}, R_{m2}, R_{m3}, \ldots, R_{mn}$ The third step is to calculate the average resistivity of the first row. A first average value of the resistivity imaging data along the borehole perimeter is $R_{1AVG}=(\Sigma R_{1y})/n$, where y=1, 2, 3, . . . , n.

The fourth step is to search, starting from the second row, the resistivity imaging data having a difference between its own resistivity and the average resistivity exceeding R_DIFF. All the data in $R_{xy}$ should be searched once. If $R_{xy}>R_{1AVG}+R\_DIFF$, the data is recorded. The subscripts values of the data, that is, x and y, are recorded in an array $U_a$, where a=1, 2, 3, . . . , i. That is, there are a total of i coordinates of imaging points having a resistivity significantly lower than the average resistivity of the first row. The specific expression of the array $U_a$ is $[(x_1, y_1), (x_2, y_2), (x_3, y_3), \ldots, (x_i, y_i)]$.

The fifth step is to calculate the orientation D_IN of entering another resistivity formation. In this step, initialize D_IN_SUM=$y_1$, and count P=1. In the array $U_a$, searching starts from $x_2$. If x=$x_1$, then D_IN_SUM=D_IN_SUM+$y_j$, and P=P+1. After the searching is completed, D_IN=D_IN_SUM/P. The position corresponding to D_IN is the orientation of entering into a different formation.

The sixth step 6 is to calculate an angle θ of entering into another formation and the average resistivity $R_{jAVG}$ of said another formation. The initial position of entering another formation is $(x_1, y_1)$, which is at row k. Then, position Y_OUT, which is a position when the drilling operation is completely within said another formation, is searched. The searching starts from $R_{1y}$, and determines the first row consisting of resistivity $R_{j1}, R_{j2}, \ldots, R_{jn}$ that are all greater than ($R_{1AVG}$+R_DIFF), which is row j. Then, the average resistivity $R_{jAVG}$ of said another formation is $R_{jAVG}=(R_{jAVG})/$ n. Therefore, the total distance S from initially entering another formation to completely entering said another formation is S=(j−k)*V, where V is rate of penetration, measured by a surface device. The angle of entering said another formation θ=arctan(S/D), where D is diameter of the borehole, directly determined by the diameter of the drilling bit.

The seventh step is to transmit the values of feature. According to a preset transmission protocol, very few feature data are transmitted to the ground through a telemetry-while-drilling system, including the average resistivity $R_{1AVG}$ of the first row, the resistivity $R_{jAVG}$ of another formation, the orientation D_IN of entering another formation, the total distance S of complete entering, or the like, for example. Combining with the parameters measured at the ground, such as the borehole diameter D and the rate of penetration V, it can determine information concerning, such as, the orientation along which the drilling tool enters, the angle thereof, or the like.

By means of the above method, the problem of low transmission speed of the telemetry-while-drilling system can be effectively solved.

Figure 4:
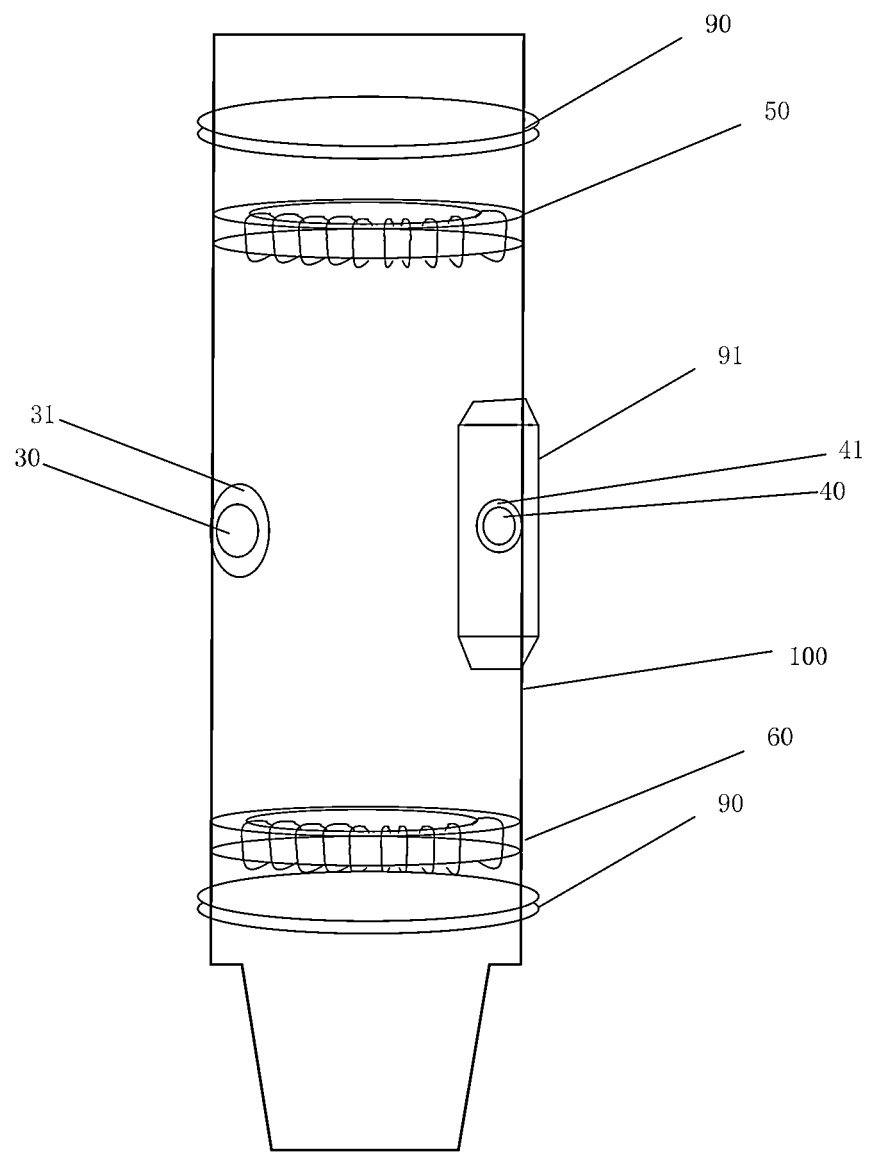
FIG. 4 schematically shows a multi-dimensional imaging MWD apparatus according to an embodiment of the present invention arranged on a drilling collar, wherein the arrangement of each module in the measurement apparatus is shown.

FIG. 4 schematically shows the arrangement of various modules on the drilling collar according to an embodiment of the present invention arranged on a drilling collar. Measurement sensors, such as the ultrasonic transducer 30, the receiving electrode 40, the upper resistivity signal transmitting toroid 50, the lower resistivity signal transmitting toroid 60 and the like are all arranged in a groove formed on a surface of the drilling collar 100. The groove is provided therein with a wiring hole, for connection with a circuit board disposed in an inner cavity of the drilling collar.

For downhole instruments, the requirement on the strength of a sub is extremely high. Generally, it is not allowed to provide too many mounting grooves in the drilling collar. Accordingly, the receiving electrode 40 and the ultrasonic transducer 30 can only be arranged between the upper resistivity signal transmitting toroid 50 and the lower resistivity signal transmitting toroid 60 in a compact manner. Such an arrangement effectively shortens the length of the sub, thus realizing the functions of two subs in one single sub.

Two annular wear-resistant strips 90 are arranged above the upper resistivity signal transmitting toroid 50 and below the lower resistivity signal transmitting toroid 60, respectively. Such a structure can protect the sensor portion from directly colliding and rubbing against the borehole wall. In addition, in order to reduce the influence of the drilling fluid in the borehole on current signals, the receiving electrode 40 is configured to protrude as close to the borehole wall as possible. In this case, a protective wear-resistant strip 91 is provided around the receiving electrode 40, for protecting the receiving electrode 40 from directly colliding and rubbing against the borehole wall. The ultrasonic transducer 30 is located in a drilling collar groove 31 of the drilling collar 100. Moreover, an annular insulating module 41 is also arranged around the receiving electrode 40, for preventing the current received by the surface of the drilling collar from negatively influencing on the receiving electrode 40.

Figure 5:
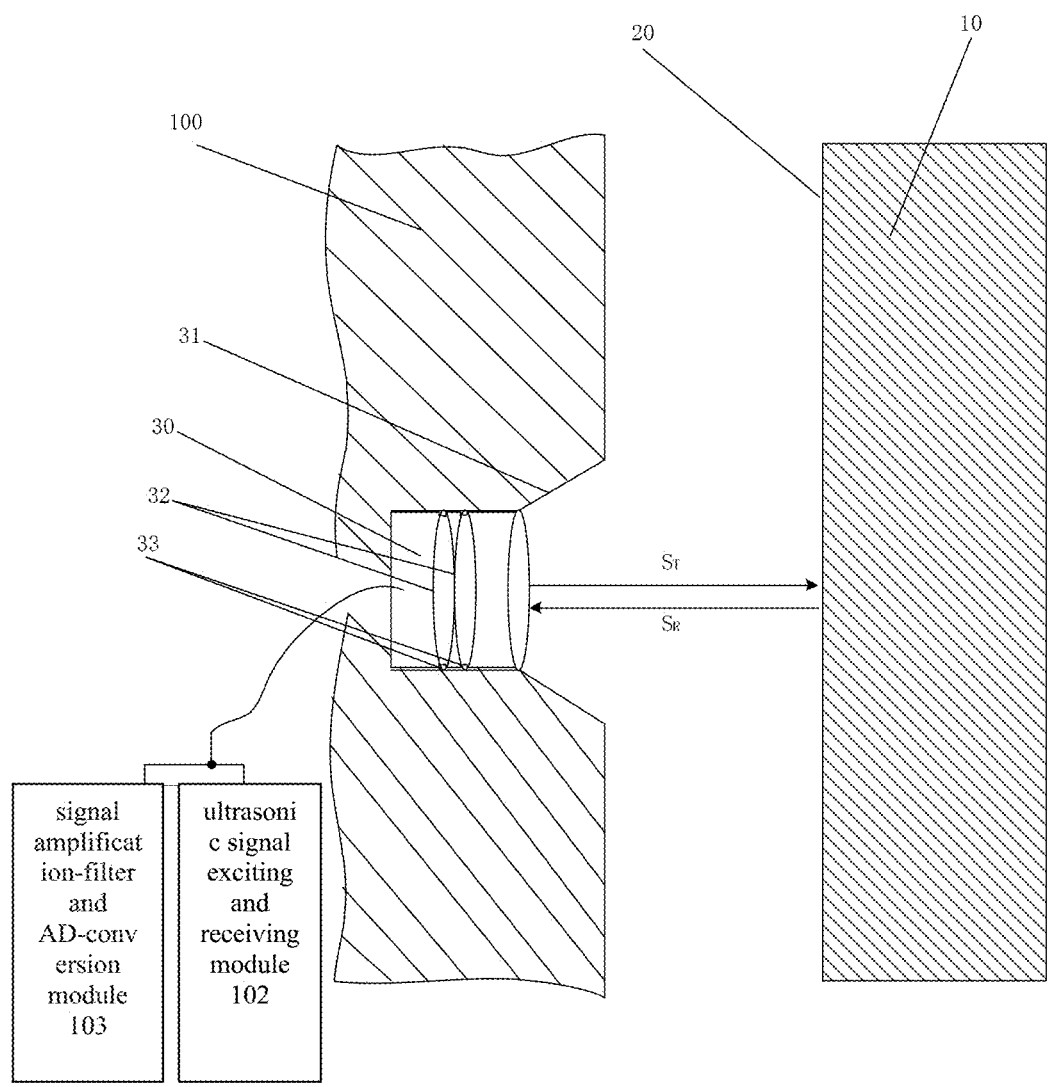
FIG. 5 schematically shows the structure of an ultrasonic transducer arranged on the drilling collar according to an embodiment of the present invention.

FIG. 5 schematically shows the structure of the ultrasonic transducer arranged on the drilling collar according to an embodiment of the present invention in detail. The drilling collar groove 31 that is slightly larger than the ultrasonic transducer 30 is provided on the outer wall of the drilling collar 100. The depth of the drilling collar groove 31 is greater than the height of the ultrasonic transducer 30 by more than 2 cm, so as to ensure that the receiving/transmitting surface of the ultrasonic transducer 30 is at least 2 cm away from the borehole wall.

The ultrasonic transducer 30 as shown in FIG. 5 functions as a transceiver, so that it needs a certain period of time for an original ultrasonic transmitting signal to be completely attenuated along the connection line. Therefore, with a distance of more than 2 cm, it can ensure that the original ultrasonic transmitting signal has been completely attenuated when the ultrasonic transducer 30 receives the ultrasound reflected from the borehole wall 20. In this case, aliasing between the original ultrasonic transmitting signal and the received ultrasound reflected from the borehole wall can be avoided, so that no measurement errors would occur.

The ultrasonic transducer 30 is arranged in the drilling collar groove 31. The outer surface of the ultrasonic transducer 30 is provided with annular grooves 33, in each of which a sealing ring 32 is installed. The sealing rings 32 can prevent the drilling fluid from entering the inner cavity of the drilling collar.

Figure 6A:
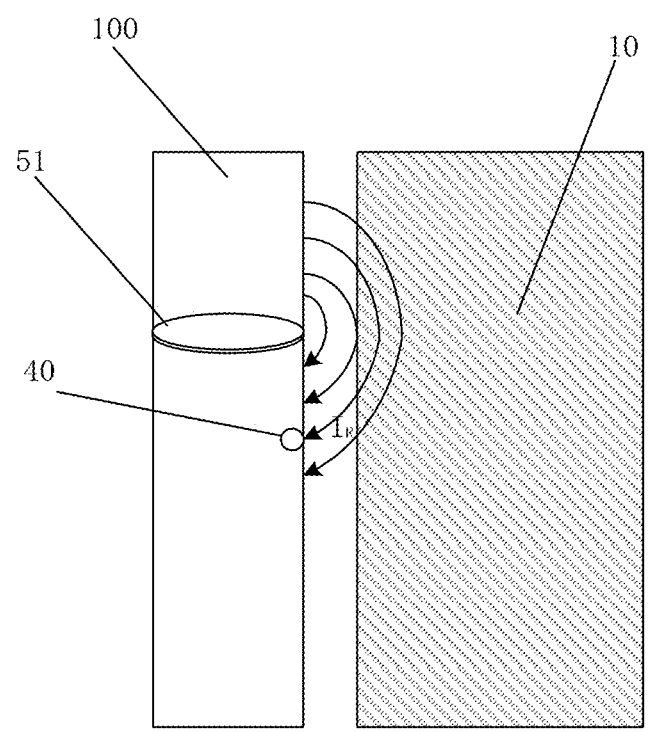
FIGS. 6a and 6b schematically show the flow directions of current signals, which are generated by one single transmitting ring and two transmitting rings, respectively, to the formation.

FIG. 6a illustrates that only one resistivity signal transmitting toroid is used for transmission. In this case, a potential difference is generated by the resistivity signal transmitting toroid, thus further generating a current. The current path is shown in FIG. 6a.

Figure 6B:
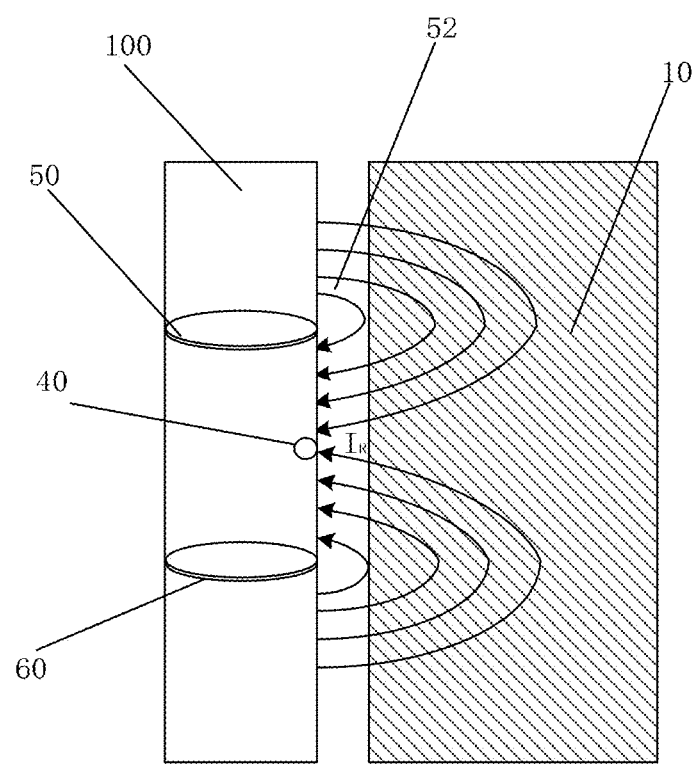

FIG. 6b illustrates that the upper and lower resistivity signal transmitting toroids are used for simultaneous transmission. In this case, an approximately equipotential body is formed on a region of the drilling collar between the upper resistivity signal transmitting toroid 50 and the lower resistivity signal transmitting toroid 60, through an electrical potential generated by the upper resistivity signal transmitting toroid 50 and that generated by the lower resistivity signal transmitting toroid 60, thus further generating a current. The current path is shown in FIG. 6b.

With a comparison between FIG. 6a and FIG. 6b, it can be seen that use of two resistivity signal transmitting toroids (i.e., the upper resistivity signal transmitting toroids 50 and the lower resistivity signal transmitting toroid 60) for simultaneous transmission may facilitate the currents run deeper into the formation, so that the measurement results are less affected by the drilling fluid in the borehole.

Figure 7:
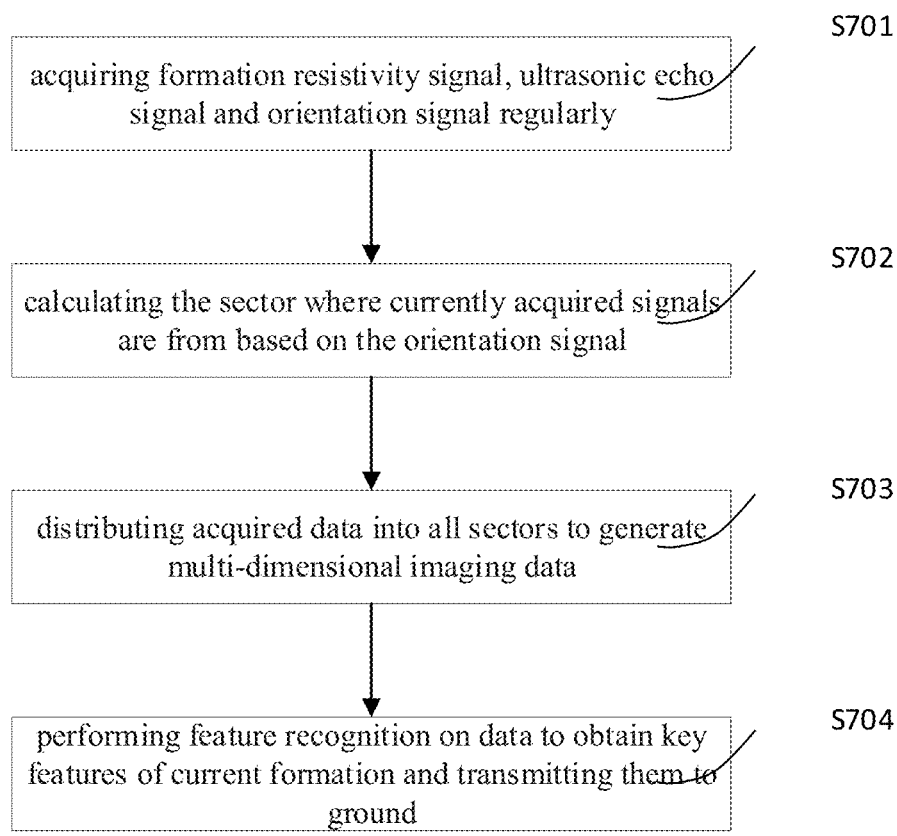
FIG. 7 shows a general flow chart of a multi-dimensional downhole imaging measurement method according to an embodiment of the present invention.

The present invention also provides a multi-dimensional imaging method, which, as illustrated in FIG. 7, includes the following steps.

In step S701, a formation resistivity signal, an ultrasonic echo signal and an orientation signal are acquired regularly.

In step S702, the sector where currently acquired signals are located is calculated based on said orientation signal.

In step S703, the data concerning the resistivity, the distance from the drilling tool to the borehole wall and the ultrasonic echo amplitude are calculated based on the formation resistivity signal and the ultrasonic echo signal as acquired, and then distributed to all sectors to generate multi-dimensional imaging data, including the imaging data of the resistivity, the imaging data of the distance from the drilling tool to the borehole wall, and the imaging data of the ultrasonic amplitude.

In step S704, feature recognition and extraction is performed on the imaging data of the resistivity, the imaging data of the distance from the drilling tool to the borehole wall, and the imaging data of the ultrasonic amplitude, in order to obtain key features characterizing current formation being drilled. The key features are transmitted to the ground for guiding the drilling process. The key features may include a transition from a high resistivity formation to a low resistivity formation, a transition from a low resistivity formation to a high resistivity formation, formation fractures, formation caves, formation collapse, and indented formations. Features such as formation fractures, formation caves, formation collapse and indented formations can also be identified through ultrasonic imaging, for mutual verification with resistivity and ultrasound. The recognition for these features is basically similar to the above, mainly through the difference of data size and the image profile.

In order to enable the apparatus of the present invention to adapt to different types of drilling fluids, the method of the present invention further comprises a step of detecting a type of drilling fluid before transmitting the signals and acquiring the signals regularly, so as to transmit AC signals of different frequencies according to different types of drilling fluids.

As shown in FIG. 7, the step of formation feature recognition comprises: selecting the resistivity imaging data along the borehole perimeter in the latest depth, which is represented by a two-dimensional array $R_{xy}$, where x is coordinate of the borehole perimeter, and y is coordinate of the depth; calculating an average resistivity for the resistivity imaging data in a first row of the two-dimensional array $R_{xy}$; searching, from a second row of the two-dimensional array $R_{xy}$, the resistivity imaging data, which has a difference between its own resistivity and the average resistivity larger than a predetermined threshold, in sequence; recording the subscript values of said data and storing them in an array $U_a$, in order to calculate the orientation and angle of entering another resistivity formation, and the total distance of entering the formation.

According to the downhole multi-dimensional imaging apparatus and method of the present invention, the structure of the imaging MWD instrument can be adequately optimized, the structural complexity of the instrument can be reduced, and an imaging measurement in multiple dimensions can be realized. According to the present invention, the resistivity receiving electrode and the ultrasonic transducer are arranged on one single sub, which can shorten the length of the MWD instrument by more than 1 m, thus not only saving the cost, but also reducing the safety risk of the instrument. By using the sector detecting module to provide sector detection for resistivity and ultrasonic signal imaging measurements, power consumption of this portion can be reduced by more than 100 mW, which is also beneficial for extending battery life and reducing use cost. The symmetrical arrangement of the upper and lower electrical signal transmitting toroids is more conducive for current signals to enter the formation, so that the measured formation resistivity is less affected by the drilling fluid in the borehole. Moreover, according to the present invention, feature recognition of imaging data can be processed underground, and key features after processed can be clearly expressed in a few bytes, so that they can be completely transmitted to the ground through the transmission-while-drilling device.

It should be understood that, the embodiments disclosed herein are not limited by the specific structures or steps disclosed herein, but incorporate the equivalent substitutes of these features which are comprehensible to those skilled in the art. It should be also understood that, the terms are used herein for describing the specific embodiments, not for limiting them.

The phrases "one embodiment" or "embodiments" referred to herein mean that the descriptions of specific features, structures, and characteristics in combination with the embodiments are included in at least one embodiment of the present disclosure. Therefore, the phrase "one embodiment" or "embodiments" that has appeared in different parts of the whole description do not necessarily refer to the same embodiment.

The embodiments are described hereinabove to interpret the principles of the present disclosure in one application or a plurality of applications. However, those skilled in the art, without departing from the principles and thoughts of the present disclosure, can make various modifications to the forms, usages, and details of the embodiments of the present disclosure without any creative work. Therefore, the scope of the present disclosure shall be determined by the appended claims.

The invention claimed is:

1. An apparatus for downhole multi-dimensional imaging, comprising:
    an acquisition unit, configured to acquire a formation resistivity signal, an ultrasonic echo signal, and an orientation signal regularly from a borehole being drilled into a formation;
    a sector calculation unit, configured to calculate, based on said orientation signal, a sector of borehole where a currently acquired signal is from;
    a multi-dimensional imaging unit, configured to calculate, based on the formation resistivity signal and the ultrasonic echo signal acquired by the acquisition unit, data of resistivity, of distance from a drilling tool to a borehole wall, and of ultrasonic echo amplitude, and distribute said data of resistivity, of distance from a drilling tool to a borehole wall, and of ultrasonic echo amplitude into all sectors of the borehole, so as to generate multi-dimensional imaging data including imaging data of the resistivity, imaging data of the distance from the drilling tool to the borehole wall, and imaging data of the ultrasonic echo amplitude; and
    a formation feature recognition unit, configured to perform feature recognition and extraction on the imaging data of the resistivity, the imaging data of the distance from the drilling tool to the borehole, and the imaging data of the ultrasonic echo amplitude, so as to obtain key features characterizing the formation being drilled, said key features being transmitted to ground for guiding drilling process,
    wherein the formation feature recognition unit is configured to:
    select the imaging data of the resistivity along a perimeter of a borehole perimeter in a latest depth, which is represented by a two-dimensional array $R_{xy}$, where x is coordinate along the perimeter of the borehole, and y is coordinate of a depth of the borehole;
    calculate an average resistivity for the imaging data of the resistivity in a first row of the two-dimensional array $R_{xy}$;
    search, from a second row of the two-dimensional array $R_{xy}$, an imaging data of the resistivity, which has a difference between its own resistivity and the average resistivity larger than a predetermined threshold, in sequence; and
    record subscript values of said image data of the resistivity and store the subscript values in an array $U_a$, in order to calculate said key features.

2. The apparatus for downhole multi-dimensional imaging according to claim 1, wherein the acquisition unit comprises:
    a resistivity detecting module comprising a current signal transmission driving circuit, a current signal transmitting ring, and a current receiving electrode, wherein the resistivity detecting module is configured to transmit a current signal generated by the current signal transmission driving circuit to the formation through the current signal transmitting ring, and then to receive a part of the current signal returned from the formation through the current receiving electrode, the part of the current signal being related to the resistivity of the formation;
    an ultrasonic signal exciting and receiving module, for transmitting ultrasound to the borehole wall and receiving an ultrasonic signal reflected from the borehole wall; and
    a sector detecting module, for detecting a current position of a tool face in a drilling rotation and to determine a sector where measured data is from.

3. The apparatus for downhole multi-dimensional imaging according to claim 2, wherein the apparatus further comprises:
    a drilling fluid detection unit, configured to detect a type of drilling fluid, so that the current signal transmission driving circuit transmits AC electrical signals of different frequencies according to different types of drilling fluids.

4. The apparatus for downhole multi-dimensional imaging according to claim 3, wherein the key features comprise: a transition from a high resistivity formation to a low resistivity formation, a transition from a low resistivity formation to a high resistivity formation, formation fractures, formation caves, formation collapse, and indented formations.

5. The apparatus for downhole multi-dimensional imaging according to claim 4, wherein the key features further comprise: the average resistivity of the first row, a resistivity of another formation, an orientation D_IN of entering another formation, an angle of entering another formation, and a total distance S of entering another formation.

* * * * *